US012338415B2

(12) United States Patent
Nguyen et al.

(10) Patent No.: US 12,338,415 B2
(45) Date of Patent: Jun. 24, 2025

(54) VEHICLE HARD SURFACE COMPOSITION CONTAINING GRAPHENE

(71) Applicant: Illinois Tool Works Inc., Glenview, IL (US)

(72) Inventors: Chi Quang Nguyen, Glenview, IL (US); John Isidoro Escoto, Jr., Glenview, IL (US); Tze-Lee Phang, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 322 days.

(21) Appl. No.: 17/898,562

(22) Filed: Aug. 30, 2022

(65) Prior Publication Data

US 2023/0257683 A1 Aug. 17, 2023

Related U.S. Application Data

(60) Provisional application No. 63/255,073, filed on Oct. 13, 2021.

(51) Int. Cl.

| | |
|---|---|
| ***C11D 3/00*** | (2006.01) |
| ***C11D 3/02*** | (2006.01) |
| ***C11D 3/20*** | (2006.01) |
| ***C11D 3/34*** | (2006.01) |
| ***C11D 3/37*** | (2006.01) |
| ***C11D 3/43*** | (2006.01) |

(52) U.S. Cl.

CPC .......... *C11D 3/2096* (2013.01); *C11D 3/0036* (2013.01); *C11D 3/0047* (2013.01); *C11D 3/02* (2013.01); *C11D 3/3418* (2013.01); *C11D 3/3738* (2013.01); *C11D 3/3765* (2013.01); *C11D 3/43* (2013.01); *C11D 2111/14* (2024.01)

(58) Field of Classification Search

None

See application file for complete search history.

(56) References Cited

U.S. PATENT DOCUMENTS

| | | | | |
|---|---|---|---|---|
| 5,507,968 A | 4/1996 | Palaikis | | |
| 5,814,951 A * | 9/1998 | Smolka | ................ | H01J 65/046 315/246 |
| 6,281,178 B1 * | 8/2001 | Ryklin | ..................... | C11D 1/37 510/180 |
| 6,953,500 B2 | 10/2005 | Lewis | | |
| 7,754,671 B2 | 7/2010 | Lin et al. | | |

(Continued)

FOREIGN PATENT DOCUMENTS

KR 102227273 B1 3/2021

OTHER PUBLICATIONS

Extended European Search Report issued in EP Appln. No. 22193132.2, dated Feb. 20, 2023.

*Primary Examiner* — Necholus Ogden, Jr.

(74) *Attorney, Agent, or Firm* — MaxGoLaw PLLC

(57) ABSTRACT

A vehicle hard surface cleaning composition is provided that includes a surfactant present from 0.1 to 8.0 total weight percent, a hydrotrope present from 0.1 to 3.0 total weight percent, a wetting agent present from 0.1 to 5.0 total weight percent, a protectant present from 0.01 to 17 total weight percent, and a diluent making up a remainder of the composition. A method of cleaning a vehicle hard surface include applying the composition thereto and washing the composition therefrom to leave a residue of graphene or graphene oxide.

16 Claims, 2 Drawing Sheets

(56) References Cited

U.S. PATENT DOCUMENTS

| | | | | |
|---|---|---|---|---|
| 11,603,510 | B2 * | 3/2023 | Emiru | C11D 3/10 |
| 2012/0252923 | A1 | 10/2012 | Serobian | |
| 2021/0189130 | A1 | 6/2021 | Phang et al. | |

* cited by examiner

Wheel shows hydrophobicity and feels smooth

Tire is clean and black (vs brownish from traditional tire cleaner)

Tire is black and Wheel is still clean

User feedback – tire stayed black after 8 wks

VEHICLE HARD SURFACE COMPOSITION CONTAINING GRAPHENE

RELATED APPLICATIONS

This application claims priority benefit of U.S. Provisional Application Ser. No. 63/255,073, filed Oct. 13, 2021; the contents of which are hereby incorporated by reference.

FIELD OF THE INVENTION

The present invention in general relates to a cleaning and protecting composition for vehicle hard surfaces, and more particularly to a cleaning composition containing graphene.

BACKGROUND OF THE INVENTION

Vehicle wheels are formed from various metal alloys. These alloys are subject to pitting associated with exposure to substance of extreme pH values of below pH 3 and about pH 9. Protective coatings are regularly applied to inhibit such pitting yet require frequent cleaning to prevent accumulation of damaging debris. By way of example, brake disc particles are composed of resin coated metals and ceramics and are routinely shed onto vehicle tires and wheels producing an adhesive grit. Road debris and tar further contaminating vehicle hard surface surfaces with extreme pH contaminants that can pit wheels. Besides tire degradation due to brake pad dust and road debris, the elastomers that compose a vehicle tire are also degraded by exposure to environmental expose to oils, solar radiation, and radicals such as ozone. While tire shine dressing compositions create a barrier to limit such damage, prior removal of grime and road debris promotes dressing composition coating an elastomeric tire surface. A common feature of these surface contaminants is that they tend to be lipophilic and as a result, are not easy removed with soap or even detergents absent mechanical forces. Resort to manual rubbing is both time consuming and can lead to underlying surface marring.

The concept of traditional cleaning detergent is to use surfactants to adhere and penetrate the grime and then detach soil from the vehicle hard surface surfaces. In these typical cleaning detergent formulations, builders are used to help surfactants remove dirt and enhance surfactant performance on soil removal. Chelating agents are often present to complex metal ions to improve cleaning efficiency. However, the cleaning power is still not strong enough to remove all the dirt when these cleaners are applied and then removed with hose pressure water.

Graphene has the performance similar to surfactant and can remove lipophilic greases and debris. Graphene also has the property of far infrared absorption, electrical conductivity, and ultraviolet light blocking properties.

Thus, there exists a need for an aqueous vehicle hard surface cleaning composition that has superior properties through inclusion of graphene. There further exists a need for an method of cleaning to retain the appearance and lifetime of a wheel, a tire, or combination thereof.

SUMMARY OF THE INVENTION

The present disclosure provides a vehicle hard surface cleaning composition that includes a surfactant present in an amount of 0.1 to 8.0 total weight percent, a hydrotrope present in an amount of 0.1 to 3.0 total weight percent, a wetting agent present in an amount of 0.1 to 5.0 total weight percent, a protectant present in an amount of 0.01 to 17 total weight percent, and a diluent making up a remainder of the composition. The present disclosure also provides a method of cleaning a vehicle hard surface that includes applying the described composition to a surface to lift grime from the applied surfaces.

DETAILED DESCRIPTION OF THE INVENTION

Figure 1A:
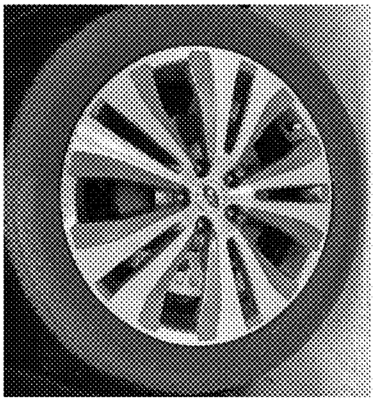
FIG. 1A is an image of a wheel before treatment by the present invention.
Figure 1B:
FIG. 1B is an image of the wheel with an as-applied inventive wet coating.
Figure 1C:
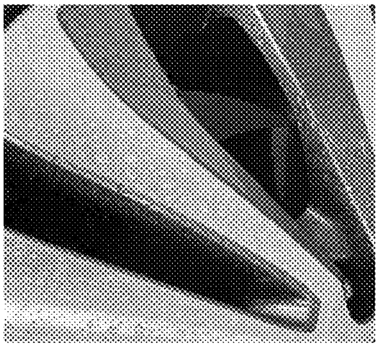
FIG. 1C is a magnified image of the wheel in FIG. 1B, the coating having hydrophobicity and a smooth feel.
Figure 1D:
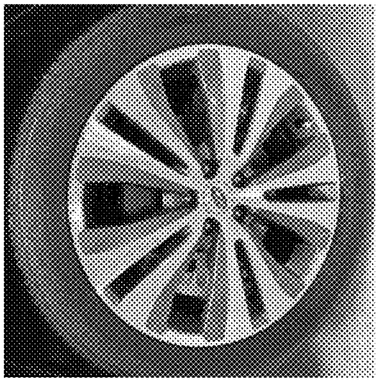
FIG. 1D is an image of the wheel with the as-applied inventive coating dried showing that the tire is clean and black as compared to the brownish color of a traditional tire cleaner.
Figure 1E:
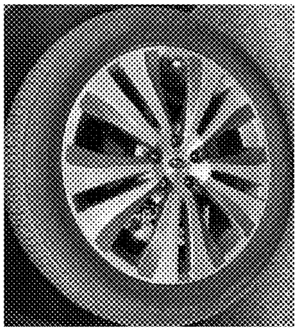
FIG. 1E is an image of the wheel of FIG. 1D after driving showing the tire remains black and clean.
Figures 2A, 2B, 2C:
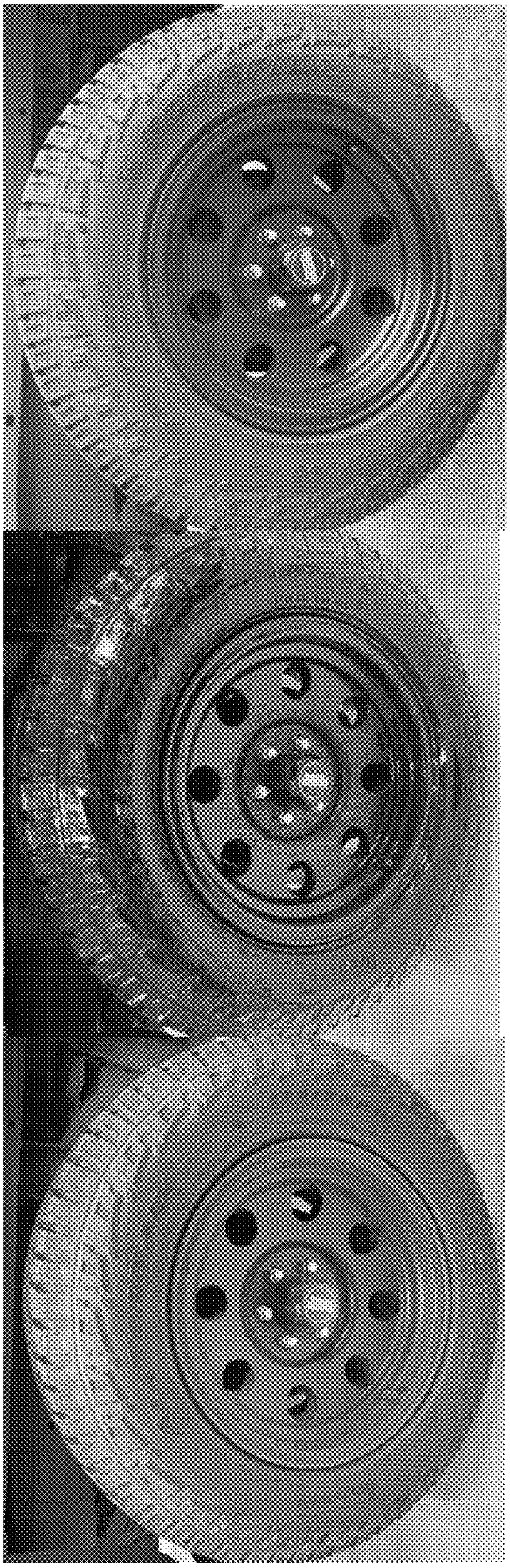
FIG. 2A is an image of a wheel before treatment by the present invention.
FIG. 2B is an image of the wheel with an as-applied inventive wet coating.
FIG. 2C is an image of the wheel of FIG. 2B after driving 8 wks showing the tire remains black and clean.

The present invention has utility as a vehicle hard surface cleaning composition to remove adhered grime and leave a protective residue of graphene that also imparts lubricity to the surface. The inclusion of graphene improves the surfactancy of the composition relative to a like composition lacking graphene.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

As used herein double-layer graphene is defined as a stack graphene of two layers, few-layer graphene is defined as a stack of graphene of 3-10 layers, graphene nanoplatelet is defined as a stack of graphene of more than 10 layers. The graphene materials can be made by chemical or mechanical exfoliation of graphite, chemical vapor deposition, physical vapor deposition, microwave plasma, sonication/cavitation in solvent, organic synthesis, and epitaxy growth on a substrate.

As used herein, graphene oxide is defined as a graphene with various oxygen-containing functionalities such as epoxide, carbonyl, carboxyl, and hydroxyl groups and a total oxygen content of 10-60 weight percent, typically around 20-50 weight percent As used herein, reduced graphene oxide is defined as graphene oxide that has been chemically or thermally reduced with a total oxygen content of typically in the range of 10%-50% depending on the extent of the reduction.

As used herein, a nanoplatelet is defined as having planar dimensional in orthogonal direction of each independently between 2 and 20 nanometers.

As used herein, a vehicle hard surface is intended to include wheels, tires, dashboards, steering wheels, consoles, and vehicle interior trim.

Graphene is layered $sp^2$-hybridized carbon atoms in a honeycomb-like, 2-dimensional sheet. Graphene is known to have excellent mechanical strength and flexibility, thermal and electric conductivities, and much higher optical cross section relative to many polymer coatings. Graphene as used in the present invention have a maximal linear extent in the three orthogonal X-Y-Z directions of between 3 and 50 nm, and secondary linear extent to at least 20 percent of the maximal linear extent. In addition, the graphene has an aspect ratio between about 25 and 25,000 between the maximum linear extent and the minimum linear extent, synonymously referred to herein as thickness. Ultra-thin graphite with average thickness is between 20 to 100 nm is also considered as a graphene-type material which can give similar performance enhancement like graphene in many real-world applications.

Graphene-type materials operative in the present invention include single-layer graphene, double-layer graphene, few-layer graphene, graphene oxide (GO), reduced graphene oxide (rGO), exfoliated graphene nanoplatelets, and ultra-thin graphite because all of these materials can enhance properties of compositions to which they are added.

In inventive embodiments of the hard surface treatment composition, the graphene can be single layer graphene, few-layer graphene, or multi-layer graphene nanoplatelet, or a combination thereof. Graphene nanoplatelet is low cost and has an easy-handling nature as compared to single layer graphene. The thickness and size of graphene or graphene nanoplatelets can be adjusted to meet the processing requirements, coating quality, and coating performance needs. In addition to graphene or graphene nanoplatelet, other additives may be added in the formulation to provide different properties and functionalities. Such additives include but are not limited to graphite, carbon black, carbon fibers, carbon nanotubes, metallic or ceramic flakes or particles.

According to embodiments, a vehicle hard surface cleaning composition includes a surfactant, a hydrotrope, a wetting agent, a protectant, and a diluent. According to embodiments, the surfactant is present in an amount of 0.1 to 8.0 total weight percent, the hydrotrope is present in an amount of 0.1 to 3.0 total weight percent, the wetting agent is present in an amount of 0.1 to 5.0 total weight percent, the protectant is present in an amount of 0.01 to 17 total weight percent, and the diluent is present in an amount that constitutes a remainder of the composition, such that the amounts of all elements of the vehicle hard surface cleaning composition total 100 percent.

The surfactant acts as a cleaning agent to boost cleaning of a vehicle hard surface. According to embodiments, surfactants operative herein are soluble in water, alcohol, and biobased solvent systems. According to embodiments, the surfactant may be selected from a variety of anionic, cationic, non-ionic, and alcohol ethoxylate surfactants. According to embodiments, surfactants operative herein illustratively include nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate, polymeric fluorinated, ethoxylated alcohol, ethoxylated fatty acid, sorbitan ester, ethoxylated castor oils, alkyl polysaccharides, sorbitan monostearate, sorbitan monolaurate, sorbitan oleate, polyoxyethylene sorbitan, polyoxyethylene sorbitan fatty acid ester, polyoxyethylene sorbitan monooleate surfactants; or anionic phosphonated fluorinated, phosphate ester, aliphatic phosphate ester; or cationic ethoxylated fatty ammonium ethosulphate, ethoxylated alkyl amine; or $C_{8-28}$ alkyl betaine and $C_{8-28}$ alkyl amido betaines; $C_{8-16}$ alkyl polyglycosides; or combinations of any of the aforementioned. Specific non-ionic surfactants operative herein illustratively include lauramidopropylamine oxide, myristamidopropylamine oxide, a mixed lauramidopropylamine and myristamidopropylamine oxide, $C_{9-11}$ ethoxylated alcohols having EO values from 2.5-9, or combinations thereof. In some inventive embodiments, EO 2.5 $C_{9-11}$ ethoxylated alcohol is used in combination with one or more EO 6-9 $C_{9-11}$ ethoxylated alcohols. The ratio of EO 2.5:EO 6-9 $C_{9-11}$ ethoxylated alcohols being between 0.1-1:1. In still other embodiments, the mixing 2.5 EO and 6-9 EO $C_{9-11}$ ethoxylated alcohols are used in combination with a non-ionic amine oxide. According to embodiments, classes of surfactants operative herein include $C_{10}$-$C_{16}$ alkylbenzenesulfonic acid sodium salt, $C_{12}$-$C_{14}$ amine oxide, or a combination thereof. As noted above, the surfactant is present in an amount of 0.1 to 8.0 total weight percent. According to some inventive embodiments, the surfactant is a combination of $C_{10}$-$C_{16}$ alkylbenzenesulfonic acid sodium salt present in an amount of 0.5 to 5.0 total weight percent and $C_{12}$-$C_{14}$ amine oxide present in an amount of 0.3 to 3.0 total weight percent.

Non-ionic surfactants operative herein in some inventive embodiments have hydrophile/lipophile balance (HLB) values between 10 and 20. In some inventive embodiments a mixture of surfactants are present with different HLB values to facilitate removal of a variety of surface contaminants. By way of a example a first surfactant has an HLB value of between 10 and 13, and a second surfactant has an HLB value of between 14 and 19. In some inventive embodiments these are present at 0.5-5 and 0.1-3 total weight percent, respectively, Examplary examples of a first and second surfactant are $C_{10}$-$C_{16}$ alkylbenzenesulfonic acid sodium salt, and $C_{12}$-$C_{14}$ amine oxide.

The hydrotrope operative herein illustratively includes xylene sulfonates, cumene sulfonates, p-toluene sulfonates, $C_4$-$C_{24}$ iminodipropionates or combinations thereof without regard for the cationic counterion. According to embodiments, the hydrotrope is sodium xylene sulfonate or sodium octyliminodipropionate. As used herein, "hydrotrope" is defined as compound that solubilizes hydrophobic compounds in aqueous solutions by means other than micellar solubilization and includes a hydrophilic moiety and a hydrophobic moiety yet is too small to cause spontaneous self-aggregation. The hydrotrope also acts as a wetting agent. As noted above, the hydrotrope is present in an amount of 0.1 to 3.0 total weight percent.

The wetting agent is present in the composition to promote wetting, reduce surface tension, enhance leveling, and film forming characteristics on vehicle hard surfaces. The wetting agent also acts as an emulsifier and a penetrating agent. According to embodiments, the wetting agent is dimethicone PEG-8 succinate, branched secondary alcohol ethoxylate, 8 EO, or a combination thereof. According to embodiments, the wetting agent is a combination of Dimethicone PEG-8 Succinate present in an amount of 0.5 to 3.0 total weight percent and branched secondary alcohol ethoxylate, 8 EO present in an amount of 0.1 to 2.0 total weight percent.

The protectant provides protection to the clean a vehicle hard surface against weather elements and stains. According to embodiments, the protectant is a graphene, colloidal silica, amodimethicone, methoxydimethicone, silanes that are liquid at standard temperature and pressure, or a combination thereof. According to embodiments, the protectant may additionally act to prevent corrosion and soiling, to repel water, as a binding agent and as a gloss agent to impart shine to the vehicle hard surface. As noted above, the protectant is present in an amount of 0.01 to 17 total weight percent. According to some inventive embodiments, the protectant is a combination of a graphene present in an amount of 0.01 to 0.1 total weight percent. Graphene aqueous dispersions are readily formed according to conventional techniques. Li, D., Müller, M., Gilje, S. et al. "Processable aqueous dispersions of graphene nanosheets." Nature Nanotech 3, 101-105 (2008). When referring to such a dispersion, the amounts include all components thereof. The amounts of graphene in such a dispersion typically range from 0.03 to 10 weight percent of such a dispersion. According to other inventive embodiments, the protectant is a combination of a graphene dispersion present in an amount of 0.01 to 0.1 total weight percent, colloidal silica present in an amount of 0.1 to 3.0 total weight percent, amodimethicone present in an amount of 0.5 to 3.0 total weight percent, and methoxydimethicone present in an amount of 0.5 to 10 total weight percent.

Not to be limited to a particular theory, graphene interacts with other substances such as dust particles and can attach themselves to the dust particles to facilitate the cleaning process and also to keep the treated surface clean and easier to clean. The low surface energy of graphene also promotes vehicle hard surface adhesion and hardens the surface against abrasion.

According to embodiments, the diluent is water as the majority by weight component of the composition with lesser amounts of miscible secondary solvents.

According to embodiments, the vehicle hard surface cleaning composition additionally includes a rheology modifier, which according to embodiments is present in an amount of 0.1 to 1.0 total weight percent. According to embodiments, the rheology modifier is a cellulose based or ASE type or HASE type polymer which act as a thickener to create a pseudoplastic liquid that provides cling ability to vertical surfaces for effective cleaning. According to other inventive embodiments, the rheology modifier is acrylates/beheneth-25 methacrylate copolymer, hydroxypropyl guar gum, polyethylene oxide, or a combination thereof.

According to embodiments, the vehicle hard surface cleaning composition additionally includes a dispersant, which according to embodiments is present in an amount of 0.1 to 1.5 total weight percent. According to embodiments, the dispersant is sodium polyacrylate. The dispersant also acts as an anti-soil redeposition agent.

According to embodiments, the vehicle hard surface cleaning composition additionally includes a solvent, which according to embodiments is present in an amount of 1.0 to 5.0 total weight percent. according to embodiments, the solvent is a glycol ether solvent, such as diethylene glycol monobutyl ether. The solvent being separate from water that makes up the remainder of the composition.

According to embodiments, the vehicle hard surface cleaning composition additionally includes a soil capturing agent, which according to embodiments is present in an amount of 0.5 to 5.0 total weight percent. According to other inventive embodiments is ethylenediamine disuccinic acid (EDDS), ethylenediamine dimalonic acid (EDDM), and ethylenediamine diglutaric acid (EDDG), ethylenediaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenetetramine (Trien), triaminotriethylene amine, triethanolamine, malonic acid, succinic acid, glutaric acid, citric acid, fumaric acid, maleic acid, aconitic acid, hydroxyethylethylene diamine triacetic acid (HEDTA), or combinations thereof. Each of the aforementioned is operative herein regardless of the mix of cationic counterions including onium, sodium, potassium, and calcium.

According to embodiments, the vehicle hard surface cleaning composition additionally includes a pH modifier, which according to embodiments is present in an amount of 0.1 to 0.5 total weight percent. The pH modifier operative herein illustratively includes liquid sodium silicate, potassium carbonate, sodium carbonate, sodium citrate, amino-2-hydroxyethane, 2-[bis(2-hydroxyethyl)amino]ethanol, 2-amino-2-methyl-1-propanol, soda ash, sodium hydroxide, lime, and a combination thereof. According to embodiments, the pH modifier is one of acid citric or sodium citrate. The pH modifier also acts as a soil-capturing agent.

An inventive vehicle hard surface cleaning composition has a fully formulated viscosity of between 5 and 400 cSt, as measured at room temperature.

Typical vehicle hard surface cleaning compositions according to the present invention are provided in Table 1.

TABLE 1

Inventive Vehicle hard surface Cleaning Compositions (amounts in total weight)

| Ingredient | Typical Amount Present (wt %) | Preferred Amount Present (wt %) |
|---|---|---|
| Surfactant | 0.1 to 8.0 | 1 to 3.3 |
| Hydrotrope | 0.1 to 3.0 | 0.2 to 0.6 |
| Wetting Agent | 0.1 to 5.0 | 0.8 to 2.9 |
| Protectant | 0.01 to 17 | 2 to 7 |
| Rheology modifier | 0 to 1.0 | 0.1 to 0.6 |
| Dispersant | 0 to 1.5 | 0.3 to 1.1 |
| Solvent | 0 to 5.0 | 2 to 4 |
| Soil-capturing agent | 0 to 5.0 | 1 to 3 |
| pH modifier | 0 to 0.5 | 0.1 to 0.8 |
| Diluent | Remainder up to 100% | Remainder up to 100% |

The method of cleaning the vehicle hard surface may be by spraying on the aqueous cleaning composition and wiping off or rinsing off the aqueous cleaning composition with water and wiping to shine. The present exemplary embodiments are effective as, spray on, wipe off cleaner, which may effectively remove most of traffic/automotive soil contaminants from automobile tire wheel substrates such as alloy, aluminum, anodized, steel, paint and plastic trimmed wheels, preferably without harm to the various metallurgies/materials used in wheel production, as well as other vehicle hard surface both interior and exterior to the vehicle. By cleaning regularly, wheels will retain their original finish and resist the damage, which can be caused by brake dust. The aqueous hard surface cleaning composition is a neutral alkaline aqueous cleaning composition, which has a pH from 6.5 to 9.5. Thus, a vehicle hard surface with dirt thereon may be cleaned by applying the aqueous cleaning composition to the surface, removing at least a portion of the dirt thereon.

A substrate may be cleaned with the aqueous cleaning composition by contacting the substrate with the aqueous cleaning composition for a period of time sufficient to remove substantial portion of the contaminants from the substrate. The aqueous cleaning composition may be applied in a sprayable liquid state onto the substrate and wets the grime adhered to the surface and allows removal thereof from the target surface. Upon this the cleaning composition with grime is wiped off or removed away by water. The present invention is further detailed with respect to the following nonlimiting examples that are provided to further illustrate the preparation of inventive compositions and certain attributes associated with the resulting coatings on vehicle hard surfaces.

EXAMPLES

The following compositions prove effective in vehicle hard surface cleaning, even without resort to mechanical scrubbing.

Example 1

A vehicle hard surface cleaning composition is provided that includes: $C_{10}$-$C_{16}$ alkylbenzenesulfonic acid sodium salt (HLB 11.7) present at 3 total weight percent, $C_{12}$-$C_{14}$ amine oxide (HLB 14-18) present at 2 total weight percent, sodium xylene sulfonate present from 0.6 total weight percent and functions as a hydrotrophe/wetting agent, dimethicone PEG-8 succinate present from 1.5 total weight percent and functions as a wetting agent, branched secondary alcohol ethoxylate, 8 EO is present at 0.8 total weight percent and functions as a wetting and penetrating agent, and an aqueous graphene dispersion present at 0.02 total weight percent and functions as a protectant. Water functions as a diluent that present as the remainder of the composition.

Comparative Example

The composition of Example 1 is reproduced with the graphene protectant replaced with a like amount of water.

Example 2

The composition of Example 1 is modified to include acrylates/beheneth-25 methacrylate copolymer present at 0.5 total weight percent and functions as a rheology modifier with a commensurate decrease in the amount of diluent present. The composition has vehicle hard surface cleaning properties similar to Example 1.

Example 3

The composition of Example 2 is modified to include sodium polyacrylate present at 0.6 total weight percent and functions as a dispersant and diethylene glycol monobutyl ether present at 3 total weight percent and functions as a solvent with a commensurate decrease in the amount of diluent present. The composition has vehicle hard surface cleaning properties similar to Example 1.

Example 4

The composition of Example 3 is modified to include tetrasodium ethylenediamine tetraacetic acid present at 4 total weight percent and functions as a chelating agent and acid citric/sodium citrate present each at 0.5 total weight percent with a commensurate decrease in the amount of diluent present. The composition has vehicle hard surface cleaning properties similar to Example 1.

Example 5

The composition of Example 1 is modified to include colloidal silica present at 0.5 total weight percent, amodimethicone present at 1.0 total weight percent, and methoxydimethicone present at 3 total weight percent with a commensurate decrease in the amount of diluent present. The composition has vehicle hard surface cleaning properties similar to Example 1.

Example 6

The composition of Example 1 is modified to include single layer graphene oxide dispersion in water and ethanol (10 mg/ml) present at 3 total weight percent in place of aqueous graphene dispersion present with a commensurate decrease in the amount of diluent present. The composition has vehicle hard surface cleaning properties similar to Example 1.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof are intended to define the scope of the invention.

The invention claimed is:

1. A vehicle hard surface cleaning composition comprising:

a surfactant present in an amount of 0.1 to 8.0 total weight percent;

a hydrotrope present in an amount of 0.1 to 3.0 total weight percent, where the hydrotrope is xylene sulfonates, cumene sulfonates, p-toluene sulfonates, $C_4$-$C_{24}$ iminodipropionates or combinations thereof;

a wetting agent present in an amount of 0.1 to 5.0 total weight percent;

graphene present in an amount of 0.01 to 17 total weight percent; and an aqueous diluent making up a remainder of the composition.

2. The vehicle hard surface cleaning composition of claim 1 further comprising a rheology modifier present in an amount of 0.1 to 1.0 total weight percent.

3. The vehicle hard surface cleaning composition of claim 2 wherein the rheology modifier is acrylates/beheneth-25 methacrylate copolymer, hydroxypropyl guar gum, polyethylene oxide, or a combination thereof.

4. The vehicle hard surface cleaning composition of claim 1 further comprising a dispersant present in an amount of 0.1 to 1.5 total weight percent.

5. The vehicle hard surface cleaning composition of claim 4 wherein the dispersant is sodium polyacrylate.

6. The vehicle hard surface cleaning composition of claim 1 further comprising a solvent present in an amount of 1.0 to 5.0 total weight percent.

7. The vehicle hard surface cleaning composition of claim 6 wherein the solvent is diethylene glycol monobutyl ether.

8. The vehicle hard surface cleaning composition of claim 1 further comprising a soil capturing agent present in an amount of 0.5 to 5.0 total weight percent.

9. The vehicle hard surface cleaning composition of claim 1 wherein the diluent is water.

10. The vehicle hard surface cleaning composition of claim 1 wherein the surfactant is $C_{10-16}$ alkylbenzenesulfonic acid sodium salt, $C_{12-14}$ amine oxide, or $C_{8-28}$ alkyl betaine and $C_{8-28}$ alkyl amido betaines, $C_{8-16}$ alkyl polyglycosides, or a combination thereof.

11. A method of cleaning a vehicle hard surface comprising:

applying the composition of claim 1 to a vehicle hard surface; and allowing a sufficient contact time for the composition on the vehicle hard surface before removing the composition to clean the surface and leave a residue of graphene.

12. The vehicle hard surface cleaning composition of claim 1 further comprising at least one of a colloidal silica, a silane liquid at standard temperature and pressure, amodimethicone, methoxydimethicone, or a combination thereof.

13. A vehicle hard surface cleaning composition comprising:

a surfactant present in an amount of 0.1 to 8.0 total weight percent;

a hydrotrope present in an amount of 0.1 to 3.0 total weight percent;

a wetting agent present in an amount of 0.1 to 5.0 total weight percent;

graphene present in an amount of 0.01 to 17 total weight percent;

a rheology modifier present in an amount of 0.1 to 1.0 total weight percent, where the rheology modifier is acrylates/beheneth-25 methacrylate copolymer, hydroxypropyl guar gum, polyethylene oxide, or a combination thereof; and an aqueous diluent making up a remainder of the composition.

14. The vehicle hard surface cleaning composition of claim 13 further comprising at least one of a colloidal silica, a silane liquid at standard temperature and pressure, amodimethicone, methoxydimethicone, or a combination thereof.

15. A vehicle hard surface cleaning composition comprising:

a surfactant present in an amount of 0.1 to 8.0 total weight percent;

a hydrotrope present in an amount of 0.1 to 3.0 total weight percent;

a wetting agent present in an amount of 0.1 to 5.0 total weight percent, where the wetting agent is dimethicone PEG-8 succinate, branched secondary alcohol ethoxylate, 8 EO, or a combination thereof;

graphene present in an amount of 0.01 to 17 total weight percent; and an aqueous diluent making up a remainder of the composition.

16. The vehicle hard surface cleaning composition of claim 15 further comprising at least one of a colloidal silica, a silane liquid at standard temperature and pressure, amodimethicone, methoxydimethicone, or a combination thereof.

* * * * *